(12) United States Patent
Cherepinsky et al.

(10) Patent No.: US 10,126,750 B2
(45) Date of Patent: Nov. 13, 2018

(54) KINEMATIC MOTION PLANNING WITH REGIONAL PLANNING CONSTRAINTS

(71) Applicant: SIKORSKY AIRCRAFT CORPORATION, Stratford, CT (US)

(72) Inventors: Igor Cherepinsky, Sandy Hook, CT (US); Xuchu Ding, Manchester, CT (US); Harshad S. Sane, Soutbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 20 days.

(21) Appl. No.: 15/355,555

(22) Filed: Nov. 18, 2016

(65) Prior Publication Data

US 2017/0146999 A1 May 25, 2017

Related U.S. Application Data

(60) Provisional application No. 62/257,360, filed on Nov. 19, 2015.

(51) Int. Cl.
| | |
|---|---|
| *G05D 1/02* | (2006.01) |
| *G01C 21/20* | (2006.01) |
| *G08G 5/00* | (2006.01) |

(52) U.S. Cl.
CPC .......... *G05D 1/0212* (2013.01); *G01C 21/20* (2013.01); *G05D 1/0214* (2013.01); *G05D 1/0223* (2013.01); *G08G 5/0021* (2013.01); *G08G 5/0034* (2013.01); *G08G 5/0069* (2013.01)

(58) Field of Classification Search
CPC .. G05D 1/0212; G05D 1/0214; G05D 1/0223; G08G 5/0021; G08G 5/0034; G08G 5/0069; G01C 21/20

USPC ......................................................... 701/467
See application file for complete search history.

(56) References Cited

U.S. PATENT DOCUMENTS

| | | |
|---|---|---|
| 4,812,990 A | 3/1989 | Adams et al. |
| 6,289,270 B1 | 9/2001 | Baumgarten |
| 7,231,294 B2 * | 6/2007 | Bodin .................... G01C 21/20 |
| | | 343/705 |
| 8,175,725 B2 | 5/2012 | Chandhoke |

(Continued)

FOREIGN PATENT DOCUMENTS

| | | |
|---|---|---|
| CN | 103592941 A | 2/2014 |
| CN | 104991895 A | 10/2015 |

OTHER PUBLICATIONS

EP Communication; Extended European Search Report; Application No. 16199114.6-1557; dated Apr. 24, 2017, pp. 1-10.

*Primary Examiner* — Atul Trivedi
(74) *Attorney, Agent, or Firm* — Cantor Colburn LLP

(57) ABSTRACT

An aspect includes a method of kinematic motion planning includes accessing a list of a plurality of nodes defining a plurality of potential kinematic path locations between a starting position and an ending position of a vehicle. A plurality of constraint sets is determined that apply one or more vehicle motion constraints based on a plurality of spatial regions defined between the starting position and the ending position. The constraint sets are applied in determining a plurality of connections between the nodes to form a kinematic motion path based on locations of the nodes relative to the spatial regions. The kinematic motion path is output to a dynamic path planner to complete creation of a motion path plan for the vehicle.

15 Claims, 4 Drawing Sheets

(56) References Cited

U.S. PATENT DOCUMENTS

| | | | |
|---|---|---|---|
| 8,880,246 B1 | 11/2014 | Karpenko et al. | |
| 9,317,036 B2 * | 4/2016 | Wang | G05D 1/0214 |
| 9,329,597 B2 * | 5/2016 | Stoschek | G05D 1/021 |
| 2002/0116126 A1 * | 8/2002 | Lin | G01C 21/165 |
| | | | 701/468 |
| 2006/0167601 A1 | 7/2006 | Henning et al. | |
| 2007/0179685 A1 | 8/2007 | Milam et al. | |
| 2008/0306680 A1 | 12/2008 | Marty et al. | |
| 2009/0198391 A1 * | 8/2009 | Kumar | B60L 3/12 |
| | | | 701/2 |
| 2009/0306881 A1 * | 12/2009 | Dolgov | G05D 1/0246 |
| | | | 701/28 |
| 2010/0078253 A1 * | 4/2010 | Rolfe | B60H 1/3202 |
| | | | 180/302 |
| 2010/0106356 A1 * | 4/2010 | Trepagnier | G01S 17/023 |
| | | | 701/25 |
| 2010/0299013 A1 * | 11/2010 | Dolgov | G05D 1/0274 |
| | | | 701/25 |
| 2013/0138247 A1 * | 5/2013 | Gutmann | G05D 1/0231 |
| | | | 700/253 |
| 2014/0136046 A1 * | 5/2014 | Smith | G05D 1/024 |
| | | | 701/25 |
| 2015/0170523 A1 | 6/2015 | La Civita et al. | |
| 2015/0205298 A1 * | 7/2015 | Stoschek | G05D 1/021 |
| | | | 701/23 |
| 2015/0284010 A1 * | 10/2015 | Beardsley | B60W 50/10 |
| | | | 701/41 |
| 2016/0047657 A1 * | 2/2016 | Caylor | G01C 21/005 |
| | | | 701/521 |
| 2016/0376003 A1 * | 12/2016 | Feldman | B64C 39/005 |
| | | | 703/2 |
| 2016/0378110 A1 * | 12/2016 | Phillips | G05D 1/0033 |
| | | | 701/2 |
| 2017/0106738 A1 * | 4/2017 | Gillett | B60K 7/0007 |
| 2017/0193830 A1 * | 7/2017 | Fragoso | G08G 5/0069 |
| 2017/0301242 A1 * | 10/2017 | Yu | G05D 1/0214 |

* cited by examiner

KINEMATIC MOTION PLANNING WITH REGIONAL PLANNING CONSTRAINTS

CROSS REFERENCE TO RELATED APPLICATIONS

This application claims the benefit of U.S. Provisional Application No. 62/257,360, filed Nov. 19, 2015, the contents of which is incorporated by reference in its entirety herein.

BACKGROUND

The subject matter disclosed herein generally relates to motion planning systems, and more particularly to kinematic motion planning with regional planning constraints.

Motion planning for a vehicle, e.g., an autonomous vehicle, typically involves construction of a graph or tree that represents feasible paths to various locations in an area under consideration. A common approach for motion planning is computing an obstacle free path (kinematic planning) and then computing a point-wise velocity and heading (dynamic planning) on the paths that respect vehicle dynamic and mission constraints. The two-step procedure allows constraints and problems in kinematic space to be dealt with independent of the dynamic space and leads to a well-defined dynamic problem due to specification of a curve in space. Solvers that are specialized in each space can be brought to bear and implemented efficiently, leading to a fast motion planning architecture. However, paths computed using kinematic motion planning may not be dynamically achievable by the vehicle with respect to velocity and heading constraints. For example, a kinematic path may have a bend shortly after the start point that may not be achievable given a start velocity and deceleration limits of the vehicle.

One approach to merging kinematic planning and dynamic planning involves a one-step process. However, attempting to completely merge kinematic planning and dynamic planning can increase the computation requirements exponentially (i.e., one extra dimension) and limits the use of many existing robust kinematic path solvers—leaving more complicated nonlinear optimization-based approaches that lack efficiency and solution guarantees.

BRIEF DESCRIPTION

According to an aspect of the invention, a method of kinematic motion planning includes accessing a list of a plurality of nodes defining a plurality of potential kinematic path locations between a starting position and an ending position of a vehicle. A plurality of constraint sets is determined that apply one or more vehicle motion constraints based on a plurality of spatial regions defined between the starting position and the ending position. The constraint sets are applied in determining a plurality of connections between the nodes to form a kinematic motion path based on locations of the nodes relative to the spatial regions. The kinematic motion path is output to a dynamic path planner to complete creation of a motion path plan for the vehicle.

In addition to one or more of the features described above or below, or as an alternative, further embodiments could include where the constraint sets include one or more limits on a maximum acceleration, a turn rate, and a climb rate of the vehicle.

In addition to one or more of the features described above or below, or as an alternative, further embodiments could include where the applying of the constraint sets is performed by a sampling-based tree planner, a graph planner, or a grid-based planner.

In addition to one or more of the features described above or below, or as an alternative, further embodiments could include where the connections are determined by performing a path extension of the kinematic motion path, a curve fit, or an interpolation to produce a smooth transition between the nodes with respect to the constraint sets.

In addition to one or more of the features described above or below, or as an alternative, further embodiments could include where the connections are constrained as curvature and torsion limits of the vehicle in three-dimensional space.

In addition to one or more of the features described above or below, or as an alternative, further embodiments could include where each of the spatial regions is defined as a polygon in three-dimensional space with an associated minimum or maximum speed limit defined for the vehicle.

In addition to one or more of the features described above or below, or as an alternative, further embodiments could include where the spatial regions and constraint sets are received from a mission manager.

In addition to one or more of the features described above or below, or as an alternative, further embodiments could include where the method is performed by a system of the vehicle.

According to further aspects of the invention, a kinematic motion planning system is provided for a vehicle. The kinematic motion planning system includes a processor and memory having instructions stored thereon that, when executed by the processor, cause the kinematic motion planning system to access a list of a plurality of nodes defining a plurality of potential kinematic path locations between a starting position and an ending position of the vehicle. A plurality of constraint sets is determined that apply one or more vehicle motion constraints based on a plurality of spatial regions defined between the starting position and the ending position. The constraint sets are applied in determining a plurality of connections between the nodes to form a kinematic motion path based on locations of the nodes relative to the spatial regions. The kinematic motion path is output to a dynamic path planner to complete creation of a motion path plan for the vehicle.

BRIEF DESCRIPTION OF THE DRAWINGS

Referring now to the drawings wherein like elements are numbered alike in the several FIGURES, in which.

DETAILED DESCRIPTION

In exemplary embodiments, kinematic planning is performed that incorporates region-based constraints into construction of a kinematic path that increases feasibility for velocity computations performed as part of dynamic planning in a second step of a two-step motion planning process.

Applying region-based constraints can improve kinematic path plan quality by including, for instance, velocity constraints in the kinematic planning process that are bounded within multiple spatial regions having different constraint profiles. By applying a limited set of dynamic constraints on a region basis, the resulting kinematic path that is provided to a dynamic path planner for full dynamic planning can increase the likelihood of the dynamic path planner being able to successfully produce an achievable motion path plan.

Figure 1:
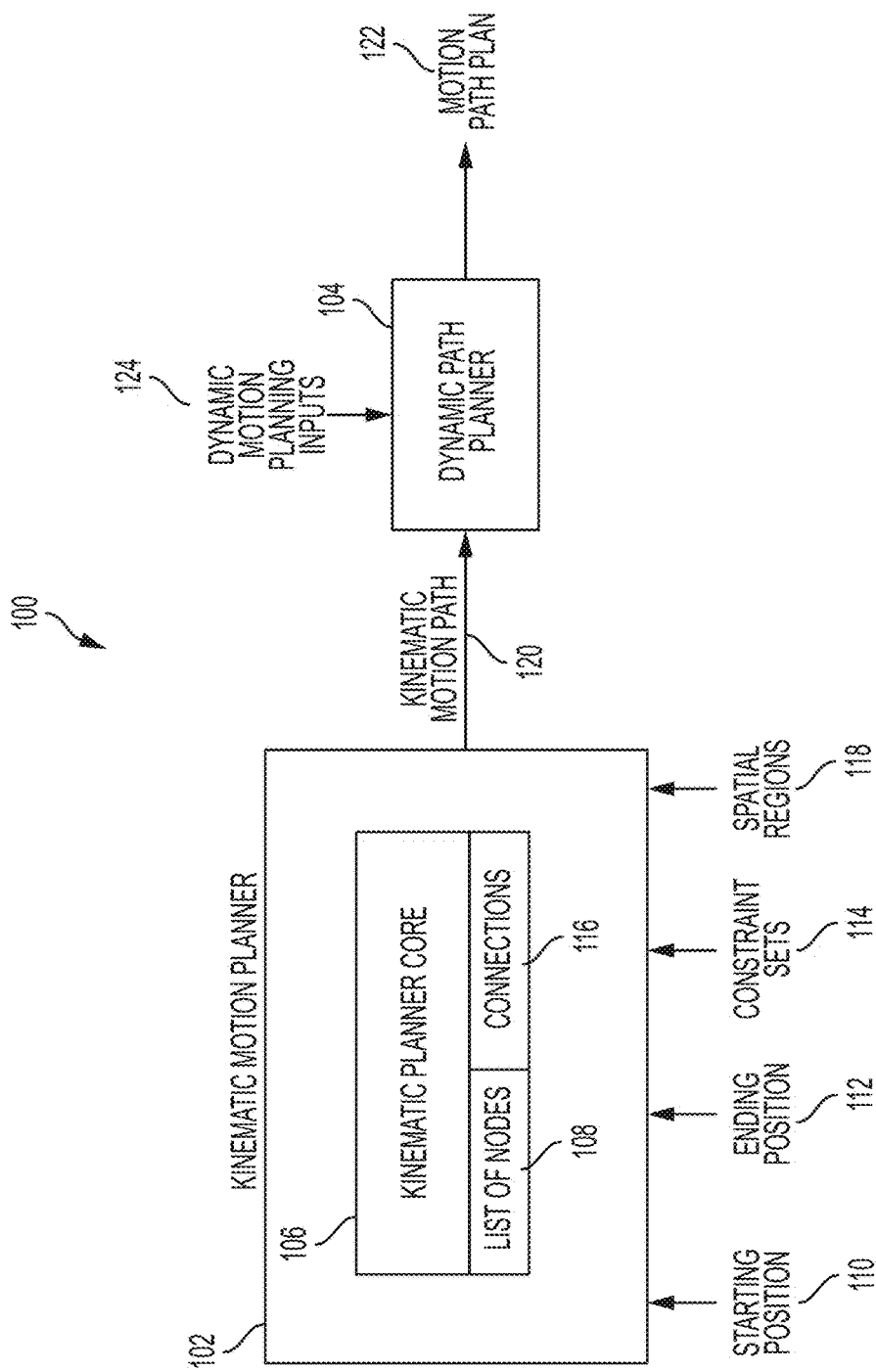
FIG. 1 schematically depicts a motion planning system in accordance with an embodiment.

FIG. 1 schematically depicts a motion planning system 100 in accordance with an embodiment. The motion planning system 100 can be implemented in a vehicle for which motion planning is to be performed. Alternatively, the motion planning system 100 can be separate from the vehicle for which motion planning is to be performed, e.g., in a remote navigation and guidance system. In the example of FIG. 1, the motion planning system 100 includes a kinematic motion planner 102 and a dynamic path planner 104. The kinematic motion planner 102 (also referred to as a kinematic motion planning system) includes a kinematic planner core 106 that generates a list of nodes 108 defining a plurality of potential kinematic path locations between a starting position 110 and an ending position 112 of a vehicle. The kinematic planner core 106 can be, for instance, a sampling-based tree planner, a graph planner, or a grid-based planner that apply constraint sets 114 in determining a plurality of connections 116 between the nodes 108 to form a kinematic motion path 118 based on locations of the nodes 108 relative to spatial regions 120. The kinematic motion planner 102 can determine (e.g., receive) the constraint sets 114 that apply one or more vehicle motion constraints based on the spatial regions 118 defined between the starting position 110 and the ending position 112. The kinematic planner core 106 may use obstacle data (not depicted) of terrain data maps that define three-dimensional contours and locations of obstacles in defining the locations of nodes 108.

In embodiments, kinematic planners such as A*, Dykstras, D*, rapidly-exploring random trees (RRT), probabilistic roadmap path planning (PRM), potential field, and variants thereof, can be modified within the kinematic planner core 106 to also apply the constraint sets 114 relative to the spatial regions 118. The kinematic planner core 106 may form connections 116 by extending a path or edge between nodes 108 (e.g., sampling-based tree or graph planners), or connect nodes 108 that are neighboring (e.g., grid-based planners). Thus, the kinematic planner core 106 can determine the connections 116 by performing a path extension of the kinematic motion path 120, a curve fit, or an interpolation to produce a smooth transition between the nodes 108 with respect to the constraint sets 114. The constraint sets 114 can include one or more limits on a maximum acceleration, a turn rate, and a climb rate of the vehicle. The connections 116 can be constrained as curvature and torsion limits of the vehicle in three-dimensional space. When nodes 108 fall in a certain spatial region, the curvature limits in that spatial region are used to impose an extension or connection to the planning graph or tree structure of the kinematic motion path 120. The spatial regions 118 can each be defined as a polygon in three-dimensional space with an associated minimum or maximum speed limit defined for the vehicle.

As one example, consider a problem of going from point A to point B while avoiding terrain. The desired start velocity at point A is V1 and at point B is V2. Assuming constant acceleration and deceleration limits, a velocity profile is derived (i.e., as a function of distance from A to B) that may be a likely velocity solution. In order to make this profile feasible, the profile can be used to compute the maximum curvature (as a function of distance between A and B) that can support this velocity that does not exceed vehicle turn and lateral acceleration limits. For points off a straight line from A to B, the curvature can be limited corresponding to ratio of distances from that point to A and B.

As another example, the spatial regions 118 can each be within a polygonal region of interest (e.g., Federal Aviation Administration (FAA) regulated airspace) where the vehicle speed must be maintained above or below certain minimum or maximum speed limits. Based on the speed limits, a three-dimensional curve can be derived and imposed on nodes 108 or node-edges lying within each of the spatial regions 118.

As a further example, a higher-level mission manager (e.g., mission manager 206 of FIG. 2) may designate regions of interest or velocity profiles of interest. These regions or profiles can be imposed in the constraint sets 114 and/or spatial regions 118 for the kinematic planner core 106 to generate the kinematic motion path 120.

With continued reference to FIG. 1, the kinematic motion planner 102 outputs the kinematic motion path 120 to the dynamic path planner 104 to complete creation of a motion path plan 122 for the vehicle. The dynamic path planner 104 can use known techniques to apply dynamic motion planning inputs 124 (e.g., vehicle speed, position, motion constraints, etc.) to the kinematic motion path 120 to produce and dynamically update the motion path plan 122.

Figure 2:
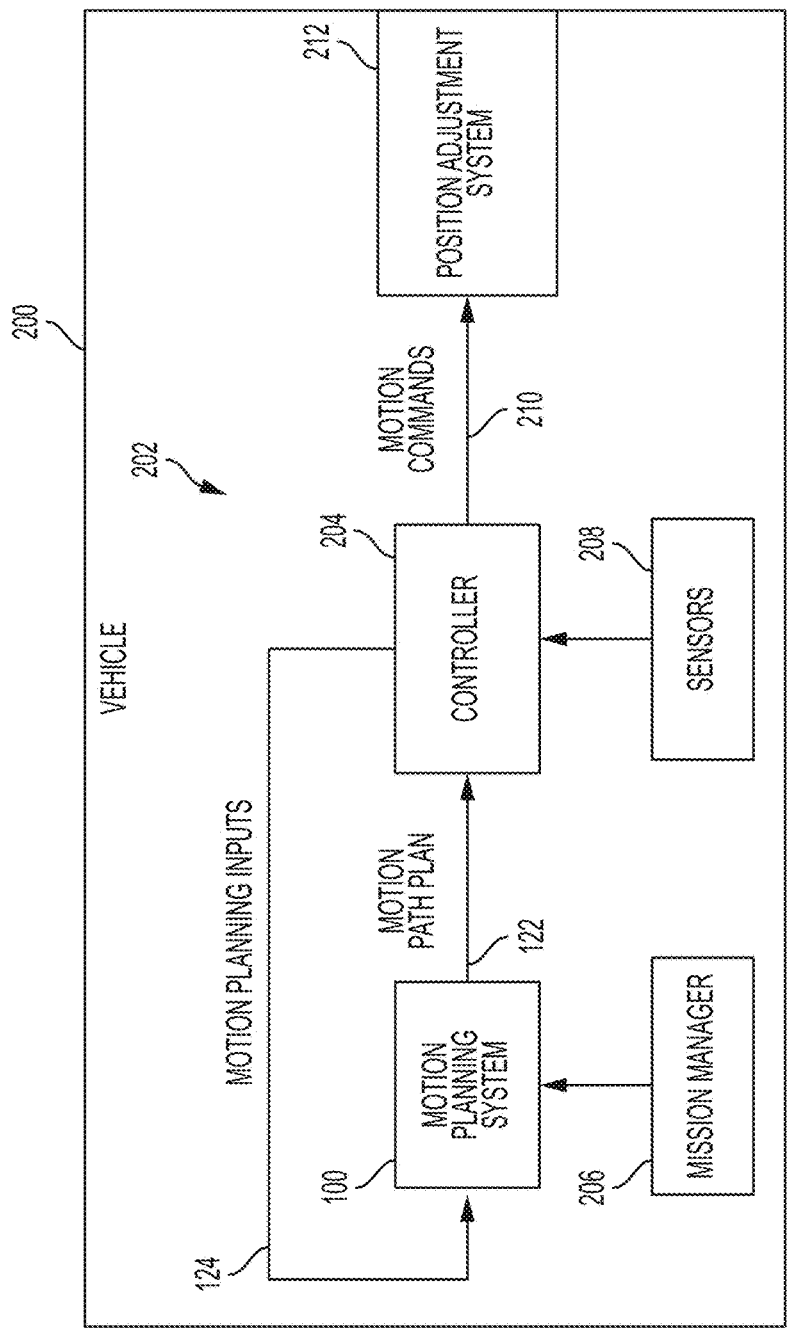
FIG. 2 schematically depicts a vehicle control system including the motion planning system of FIG. 1 in accordance with an embodiment.

FIG. 2 schematically depicts a vehicle control system 202 of a vehicle 200 including the motion planning system 100 of FIG. 1 in accordance with an embodiment. The vehicle 200 may be an optionally-piloted vehicle, an unmanned aerial vehicle, or a human piloted vehicle in which path planning assistance is desired. The vehicle 200 can be any type of movable machine, such as a fixed-wing aircraft, rotary-wing aircraft, marine vessel (e.g., submarine, ship, etc.), or land vehicle (e.g., truck, car, tank, etc.). The vehicle control system 202 includes a controller 204 that receives the motion path plan 122 from the motion planning system 100. The controller 204 examines the motion path plan 122 to guide the vehicle 200 between the starting position 110 of FIG. 1 and the ending position 112 of FIG. 1. Mission manager 206 can provide various analysis constraints to the motion planning system 100, such as one or more of the starting position 110 of FIG. 1, the ending position 112 of FIG. 1, the constraint sets 114 of FIG. 1, and/or the spatial regions 118 of FIG. 1, which are received by the motion planning system 100.

The controller 204 can monitor sensors 208 to determine the current position of the vehicle 200. The sensors 208 can also provide speed, altitude, attitude, and trajectory information for dynamic path planning. For example, the sensors 208 can include one or more inertial measurement units, a global positioning system, airspeed sensors, and other such sensor systems. The sensors 208 may also include perception sensors, such as one or more of: a downward-scanning LIDAR scanner, a video camera, a multi-spectral camera, a stereo camera system, a structure light-based 3D/depth sensor, a time-of-flight camera, a LADAR scanner, a RADAR scanner, or the like in order to capture perception sensor data to with respect to the spatial regions 118 of FIG. 1. Sensor data from the sensors 208 can be preprocessed, e.g., range checked and filtered, and provided to the motion planning system 100 in motion planning inputs 124.

The controller 204 can use data from the sensors 208 and the motion path plan 122 to determine one or more motion commands 210 for a position adjustment system 212. The position adjustment system 212 can include any combination of propulsion and trajectory controls to maneuver the vehicle 200. For example, in the context of an aircraft, the position adjustment system 212 can include flight surface controls and engine controls to adjust aircraft attitude, altitude, and speed as position changes along an obstacle-free path corresponding to the motion path plan 122.

Figure 3:
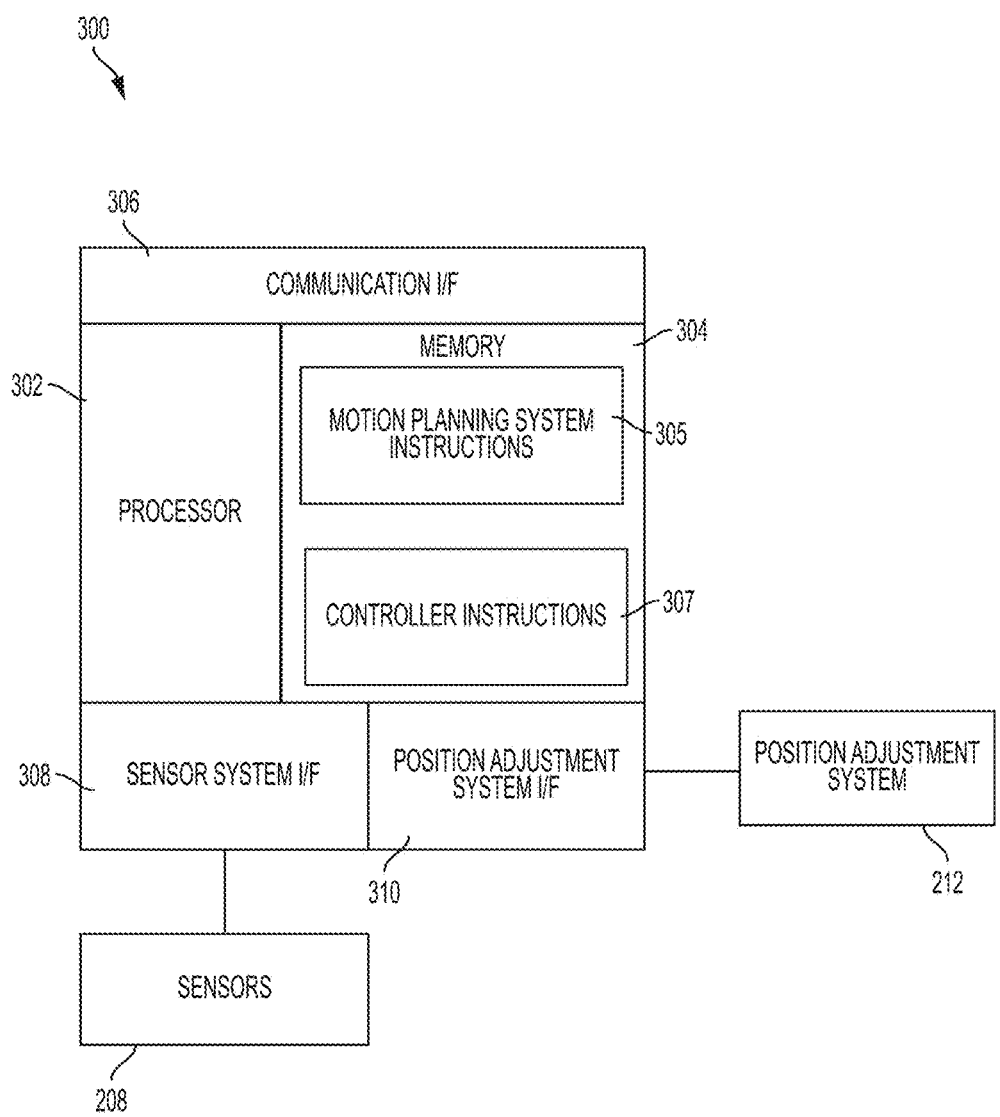
FIG. 3 schematically depicts a block diagram of a processing system for implementing the vehicle control system of FIG. 2 in accordance with embodiments.

FIG. 3 schematically depicts a block diagram of a processing system 300 for implementing the vehicle control system 202 of FIG. 2 in accordance with embodiments. The processing system 300 can be an embodiment of either or both of the motion planning system 100 of FIG. 1 and/or the controller 204 of FIG. 2. In the example of FIG. 3, the processing system 300 includes instructions and interfaces for implementing both the motion planning system 100 of FIG. 1 and the controller 204 of FIG. 2. The processing system 300 includes a processor 302, memory 304, and a communication interface 306. The processor 302 can be any type or combination of computer processors, such as a microprocessor, microcontroller, digital signal processor, application specific integrated circuit, programmable logic device, and/or field programmable gate array. The memory 304 is an example of a non-transitory computer readable storage medium tangibly embodied in the processing system 300 including executable instructions stored therein, for instance, as firmware. Examples of instructions that can be stored in the memory 304 for execution by the processor 302 include motion planning system instructions 305 and controller instructions 307. The communication interface 306 can support uploading of the constraint sets 114 of FIG. 1 and/or the spatial regions 118 of FIG. 1 along with other data.

The processing system 300 can also include a sensor system interface 308 to interface with the sensors 208. The sensor system interface 308 can include analog-to-digital converters, filters, multiplexers, built-in test support, and engineering unit conversion circuitry to condition and format signals from the sensors 208 into a format that is readily usable by the controller 204 of FIG. 2 and/or the motion planning system 100 of FIG. 1. The processing system 300 can also include a position adjustment system interface 310 to send motion commands 210 of FIG. 2 to the position adjustment system 212. The position adjustment system interface 310 may format the motion commands 210 of FIG. 2 into particular servo commands and set points for vehicle control.

Figure 4:
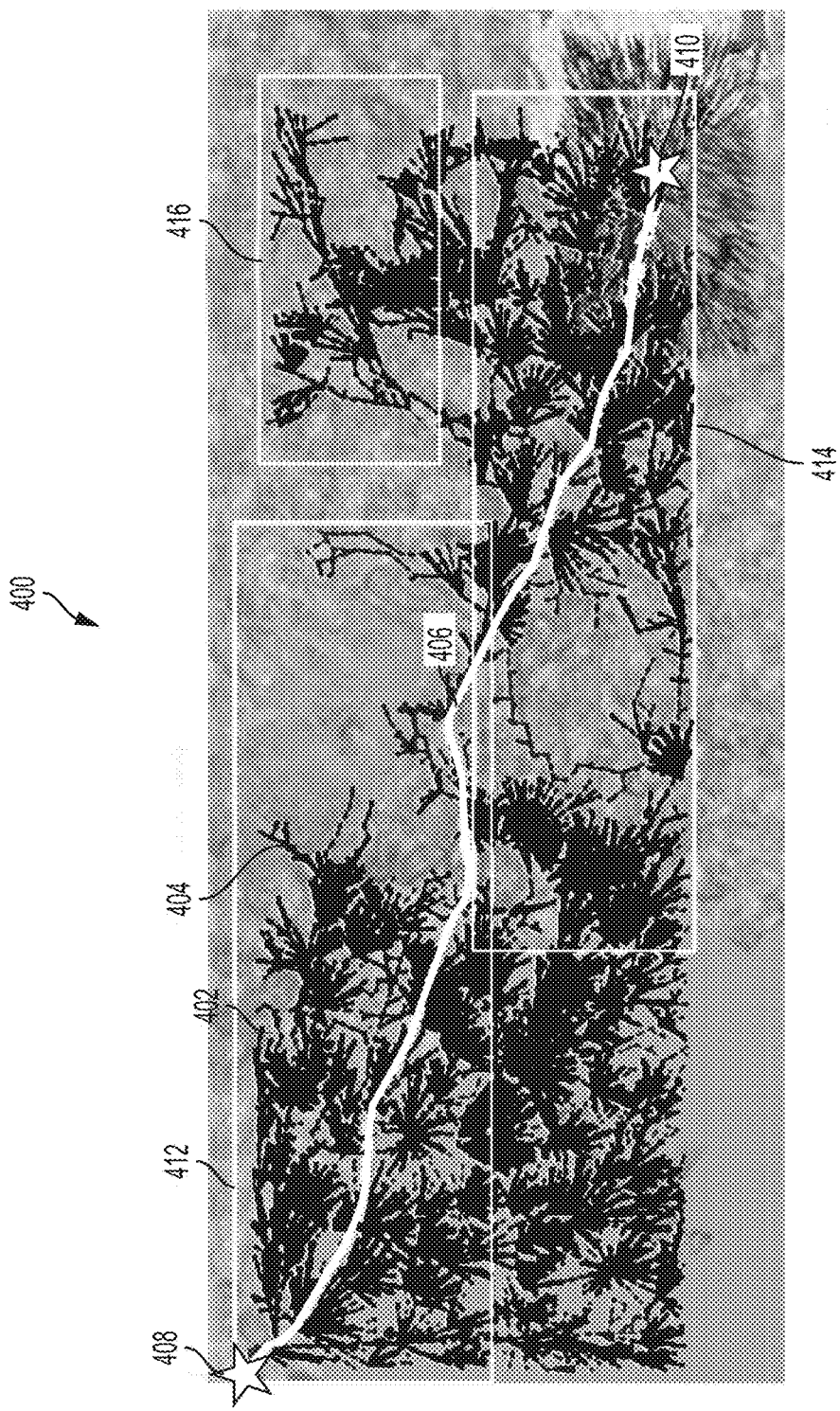
FIG. 4 depicts an example of kinematic motion planning with regional planning constraints in accordance with embodiments.

FIG. 4 depicts an example of kinematic motion planning with regional planning constraints in accordance with embodiments. In FIG. 4, a map 400 of terrain data depicts a kinematic motion path 402 that includes a number of connections 404 as path options for the dynamic path planner 104 of FIG. 1 to determine a motion path plan 406 between a starting position 408 and an ending position 410. The kinematic motion path 402, connections 404, motion path plan 406, starting position 408, and ending position 410 are examples of the kinematic motion path 120, connections 116, motion path plan 122, starting position 110, and ending position 112 of FIG. 1. A vehicle, such as vehicle 200 of FIG. 2, can use the motion path plan 406 to navigate between the starting position 408 and ending position 410 with respect to constraint sets associated with spatial regions 412, 414, and 416. The spatial regions 412, 414, and 416 are examples of spatial regions 118 of FIG. 1 that define areas/volumes (e.g., portions of two or three dimensional space) in which constraint sets 114 of FIG. 1 are applied to create connections 404 that meet the constraints specific to each of the spatial regions 412, 414, and 416. For example, spatial region 412 can be a hostile mission area is which higher limits are defined for maximum acceleration, turn rate, and climb rate to avoid potential hostile actions to the maximum capability of the vehicle 200 of FIG. 2. Spatial region 414 can be a friendly mission area, where there is more flexibility in maneuvering the vehicle 200 of FIG. 2 and connections 404 may be determined on a basis of fuel efficiency while operating within a range of capabilities of the vehicle 200 of FIG. 2. Spatial region 416 may be a terminal area defining potential paths to return to locations having other vehicles (e.g., an airfield), where maximum velocity, acceleration, and altitude constraints are defined relative to operations likely in close proximity to other vehicles and to reduce vehicle noise effects. By incorporating constraint sets for the spatial regions 412-416 into kinematic planning, path options available in the kinematic motion path 402 are more likely to be useful for the dynamic planner 104 of FIG. 1 to produce motion path plan 406 and align with higher level mission constraints of the mission manager 206 of FIG. 2.

Technical effects include integration of region-based constraints into a motion planning system of a vehicle and imposing the region-based constraints during kinematic planning prior to full dynamic planning.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of kinematic motion planning, the method comprising:
   accessing a list of a plurality of nodes defining a plurality of potential kinematic path locations between a starting position and an ending position of an aircraft;
   determining a plurality of constraint sets that apply one or more vehicle motion constraints specific to each of a plurality of spatial regions defined between the starting position and the ending position;
   applying the constraint sets in determining a plurality of connections between the nodes to form a kinematic motion path based on locations of the nodes relative to the spatial regions the kinematic motion path including the plurality of connections between the nodes as path options for a dynamic path planner to determine a motion path plan for the vehicle;
   outputting the kinematic motion path to a dynamic path planner to complete creation of a motion path plan for the aircraft, wherein the dynamic path planner applies dynamic motion planning inputs to the kinematic motion path to create the motion path plan, the dynamic motion path planning inputs including at least one of vehicle speed, position, and motion constraints; and
   adjusting a position of one or more flight control surfaces to implement the motion path plan.

2. The method of claim 1, wherein the constraint sets comprise one or more limits on a maximum acceleration, a turn rate, and a climb rate of the aircraft.

3. The method of claim 1, wherein the applying of the constraint sets is performed by a sampling-based tree planner, a graph planner, or a grid-based planner.

4. The method of claim 1, wherein the connections are determined by performing a path extension of the kinematic motion path, a curve fit, or an interpolation to produce a smooth transition between the nodes with respect to the constraint sets.

5. The method of claim 1, further wherein the connections are constrained as curvature and torsion limits of the aircraft in three-dimensional space.

6. The method of claim 1, wherein each of the spatial regions is defined as a polygon in three-dimensional space with an associated minimum or maximum speed limit defined for the vehicle.

7. The method of claim 1, wherein the spatial regions and constraint sets are received from a mission manager.

8. The method of claim 1, wherein the method is performed by a system of the aircraft.

9. A kinematic motion planning system for an aircraft, the motion planning system comprising:
a processor; and
memory having instructions stored thereon that, when executed by the processor, cause the kinematic motion planning system to:
access a list of a plurality of nodes defining a plurality of potential kinematic path locations between a starting position and an ending position of the aircraft;
determine a plurality of constraint sets that apply one or more vehicle motion constraints specific to each of a plurality of spatial regions defined between the starting position and the ending position;
apply the constraint sets in determining a plurality of connections between the nodes to form a kinematic motion path based on locations of the nodes relative to the spatial regions, the kinematic motion path including the plurality of connections between the nodes as path options for a dynamic path planner to determine a motion path plan for the vehicle;
output the kinematic motion path to a dynamic path planner to complete creation of a motion path plan for the aircraft, wherein the dynamic path planner applies dynamic motion planning inputs to the kinematic motion path to create the motion path plan, the dynamic motion path planning inputs including at least one of vehicle speed, position, and motion constraints; and
adjusting a position of one or more flight control surfaces to implement the motion path plan.

10. The kinematic motion planning system of claim 9, wherein the constraint sets comprise one or more limits on a maximum acceleration, a turn rate, and a climb rate of the aircraft.

11. The kinematic motion planning system of claim 9, wherein, wherein the constraint sets are applied by a sampling-based tree planner, a graph planner, or a grid-based planner.

12. The kinematic motion planning system of claim 9, wherein, wherein the connections are determined by performing a path extension of the kinematic motion path, a curve fit, or an interpolation to produce a smooth transition between the nodes with respect to the constraint sets.

13. The kinematic motion planning system of claim 9, wherein the connections are constrained as curvature and torsion limits of the vehicle in three-dimensional space.

14. The kinematic motion planning system of claim 9, wherein each of the spatial regions is defined as a polygon in three-dimensional space with an associated minimum or maximum speed limit defined for the aircraft.

15. The kinematic motion planning system of claim 9, wherein the spatial regions and constraint sets are received from a mission manager.

\* \* \* \* \*